United States Patent
Fitzgerald et al.

(10) Patent No.: US 8,388,489 B2
(45) Date of Patent: Mar. 5, 2013

(54) TRANSMISSION

(75) Inventors: Simon Paul Fitzgerald, Glenwood (AU); Richard Terrence Tamba, Castle Hill (AU); Darren Lee Firth, West Pennant Hills (AU)

(73) Assignee: NT Consulting International Pty Limited (AU)

( * ) Notice: Subject to any disclaimer, the term of this patent is extended or adjusted under 35 U.S.C. 154(b) by 189 days.

(21) Appl. No.: 12/740,416

(22) PCT Filed: Oct. 31, 2008

(86) PCT No.: PCT/AU2008/001625
§ 371 (c)(1),
(2), (4) Date: Jul. 16, 2010

(87) PCT Pub. No.: WO2009/055870
PCT Pub. Date: May 7, 2009

(65) Prior Publication Data
US 2010/0285918 A1    Nov. 11, 2010

(30) Foreign Application Priority Data
Nov. 1, 2007  (AU) ............................... 2007905958

(51) Int. Cl.
*F16H 3/44* (2006.01)
(52) U.S. Cl. ...................................... 475/285
(58) Field of Classification Search .................. None
See application file for complete search history.

(56) References Cited

U.S. PATENT DOCUMENTS

| | | | | |
|---|---|---|---|---|
| 4,296,646 A | * | 10/1981 | Thornton | 475/54 |
| 4,916,980 A | | 4/1990 | Asada et al. | |
| 5,046,999 A | * | 9/1991 | Liu et al. | 475/281 |
| 5,342,257 A | | 8/1994 | Hotta et al. | |
| 5,577,976 A | * | 11/1996 | Haka | 475/280 |
| 5,879,258 A | * | 3/1999 | Stevenson et al. | 475/135 |
| 5,997,429 A | * | 12/1999 | Raghavan et al. | 475/280 |
| 6,146,305 A | * | 11/2000 | Hebbale et al. | 475/284 |
| 6,193,626 B1 | * | 2/2001 | Hebbale et al. | 475/284 |
| 6,364,804 B1 | * | 4/2002 | Haka | 475/278 |
| 6,398,690 B1 | * | 6/2002 | Hebbale et al. | 475/314 |

(Continued)

FOREIGN PATENT DOCUMENTS

JP        7317852 A      12/1995

OTHER PUBLICATIONS

Stockel, M. W. "Auto Mechanics Fundamentals", South Holland, Illinois: The Goodheart-Wilizox Company, inc., 1974, ISBN 0-87006-183-6, pp. 246-260.

(Continued)

*Primary Examiner* — Dirk Wright
(74) *Attorney, Agent, or Firm* — Banner & Witcoff, Ltd.

(57) ABSTRACT

A multi-ratio automatic transmission for a vehicle, the transmission having a single planetary gear set, a plurality of friction elements for coupling components of the planetary gear set between an input and an output of the transmission in different configurations so as to achieve a plurality of forward drive ratios, and a control system for selectively engaging/disengaging the friction elements in different combinations to effect selection of the ratios, wherein the friction elements include first and second clutches mounted forward of the planetary gear set, and wherein power flow in each of the forward drive ratios is routed from the input to the planetary gear set through at least one of the first and second clutches.

17 Claims, 4 Drawing Sheets

U.S. PATENT DOCUMENTS

| | | | |
|---|---|---|---|
| 6,468,179 B1 * | 10/2002 | Mathis et al. | 475/280 |
| 7,011,596 B2 * | 3/2006 | Haka | 475/285 |
| 7,052,433 B2 * | 5/2006 | Sugiura et al. | 475/296 |
| 7,169,075 B2 * | 1/2007 | Seo et al. | 475/278 |
| 2004/0248684 A1 | 12/2004 | Sugtura et al. | |

OTHER PUBLICATIONS

International Search Report for PCT/AU2008/001625 (WO2009/055870A1), Issued Nov. 18, 2008.

* cited by examiner

FIGURE 1

| R | D | C1 | C2 | C3 | OWC | B2 | B1 |
|---|---|----|----|----|-----|----|----|
|   | - |    |    | X  |     |    | X  |
|   | 1st |  | X  |    | X   |    |    |
|   | 2nd | X | X |    |     | X  |    |
|   | 3rd | X | X |    |     |    |    |
|   | 4th |   | X |    |     | X  |    |
| M1 | 1st |  | X |    |     |    | X  |

FIGURE 4

TRANSMISSION

CROSS REFERENCE TO RELATED APPLICATIONS:

This is a U.S. National Phase Application under 35 U.S.C. §371 of International Application No. PCT/AU2008/001625 filed Oct. 31, 2008, which was published Under PCT Article 21(2) as International Publication No. WO 2009/055870 A1 on May 7, 2009, which claims priority to Australian Patent Application No. 2007905958 filed Nov. 1, 2007, the entire contents of which applications are incorporated herein by reference.

FIELD OF THE INVENTION

This invention relates to a multi-ratio automatic transmission for a vehicle, and more particularly, but not exclusively to a four speed automatic transmission having a plurality of friction elements and a single planetary gear set.

BACKGROUND OF THE INVENTION

It is known to provide an automatic transmission having a Ravigneaux Type planetary gear set and a plurality of friction elements. An example of such an automatic transmission is disclosed in U.S. Pat. No. 4,884,472. However, previously proposed automatic transmissions of this type are prone to disadvantages which the applicant has identified as being attributed to the configuration of the components within the transmissions such as, for example excessive vibration and lack of rigidity in the drive path in forward gears.

Examples of the present invention seek to provide an improved multi-speed automatic transmission for a vehicle.

SUMMARY OF THE INVENTION

In accordance with one aspect of the present invention, there is provided a multi-ratio automatic transmission for a vehicle, the transmission having a single planetary gear set, a plurality of friction elements for coupling components of the planetary gear set between an input and an output of the transmission in different configurations so as to achieve a plurality of forward drive ratios, and a control system for selectively engaging/disengaging the friction elements in different combinations to effect selection of the ratios, wherein the friction elements include first and second clutches mounted between the input and the planetary gear set, and wherein power flow in each of the forward drive ratios is routed from the input to the planetary gear set via only one or both of the first and second clutches.

Preferably, an output of the first clutch is in direct coupling with a carrier of the planetary gear set such that rotation of the output of the first clutch causes rotation of the carrier. More preferably, an output of the second clutch is in direct coupling with a sun gear of the planetary gear set such that rotation of the output of the second clutch causes rotation of the sun gear. In a preferred example, the sun gear is a forward sun gear of the planetary gear set.

Preferably, a ring gear of the planetary gear set is in direct coupling with the output of the transmission such that rotation of the ring gear causes rotation of the output of the transmission. More preferably, the output of the transmission is in the form of an output gear fixed to the ring gear, and the output gear is in direct rotation coupling with a pinion shaft, which in turn is in direct rotation coupling with a differential of the vehicle.

In a preferred form, the second clutch is nested within the first clutch such that second clutch rotates within a cavity formed within the input and output parts of the first clutch.

Preferably the multi-ratio automatic transmission includes a third clutch mounted behind the planetary gear set, wherein power flow in a reverse drive ratio of the transmission is routed from the input of the transmission to the planetary gear set through the third clutch.

Preferably, the multi-ratio automatic transmission includes first and second brake clutches, wherein the first brake clutch is arranged to brake the carrier of the planetary gear set to a housing of the transmission, and the second brake clutch is arranged to brake a rear sun gear of the planetary gear set to the housing of the transmission.

Preferably, the multi-ratio automatic transmission includes a one-way clutch, wherein the one-way clutch is arranged to allow rotation of the carrier only in one direction relative to the housing of the transmission, such that rotation of the one-way clutch prevents the transmission from providing braking from input to output in at least one forward driving state, and in other gear states the one-way clutch is bypassed to permit braking from input to output.

In an example, when in a first gear state of a first ratio, the second clutch is engaged, the first brake clutch is engaged, and the other friction elements are disengaged. When in an alternative gear state of the first ratio, the second clutch is engaged, and the other friction elements are disengaged. In a second ratio of the transmission, the second clutch is engaged, the second brake clutch is engaged, and the other friction elements are disengaged. In a third ratio of the transmission, the first and second clutches are engaged, and the other friction elements are disengaged. In a fourth ratio of the transmission, the first clutch is engaged, the second brake clutch is engaged, and the other friction elements are disengaged. In a reverse ratio of the transmission, the third clutch is engaged, the first brake clutch is engaged, and the other friction elements are disengaged. In a selected neutral condition of the transmission, none of the friction elements are engaged.

Preferably, the first clutch is the front-most component mounted in a main housing of the transmission. In one form, the main housing of the transmission is located behind a torque converter which couples the input of the transmission to an engine of the vehicle. In an alternative form, the input of the transmission is coupled to an engine of the vehicle by way of a two-speed decoupler, a damper only, or a launch clutch.

BRIEF DESCRIPTION OF THE DRAWINGS

The invention is described by way of non-limiting example only, with reference to the accompanying drawings in which.

DETAILED DESCRIPTION

Figure 1:
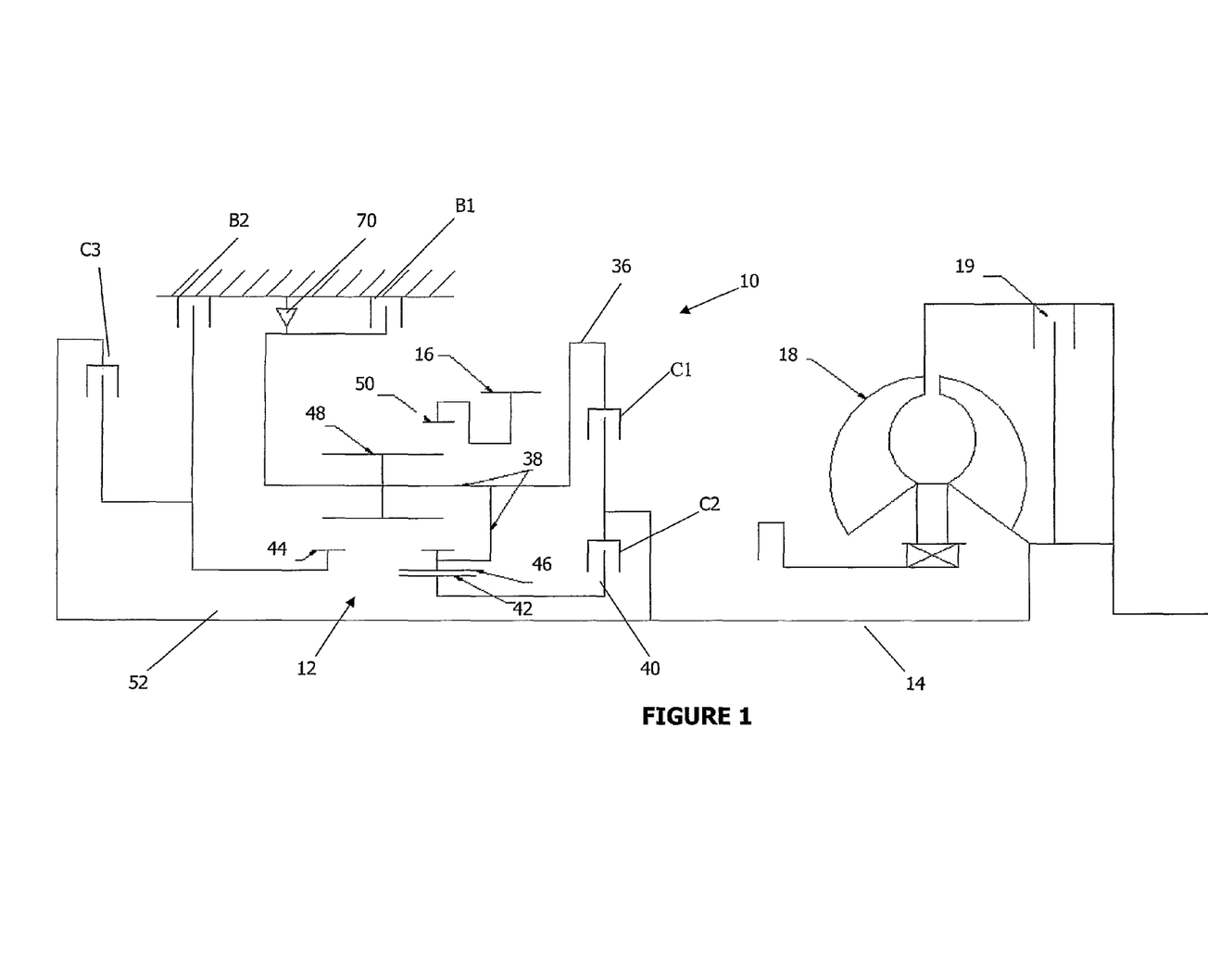
FIG. 1 is a diagrammatic representation of a component layout of a transmission in accordance with an example of the present invention, shown as a sectional side view of an upper half of the transmission.

With reference to FIG. 1, there is shown a simplified diagrammatic representation of a multi-ratio automatic transmission 10 for a vehicle, in accordance with an example of the present invention. The transmission 10 has a single planetary gear set 12, and a plurality of friction elements for coupling components of the planetary gear set 12 between an input 14 and an output 16 of the transmission 10 in different configurations so as to achieve a plurality of forward drive ratios. The plurality of friction elements includes a first clutch C1, a second clutch C2, a third clutch C3, a first brake clutch B1 and a second brake clutch B2. The first clutch C1 and the second clutch C2 are mounted forward of the planetary gear set 12, behind a torque converter 18 (with lock-up clutch 19) through which power is transmitted from an engine (not shown) of the vehicle to the transmission 10. The transmission 10 is arranged such that power flow in each of the forward drive ratios is transmitted from the input 14 to the planetary gear set 12 via only one or both of the first and second clutches C1, C2.

Accordingly, for all forward drive ratios the entire power flow path of driving rotation from the input 14 to the planetary gear set 12, in a direction parallel to a main axis 52 of the transmission 10, is at or between the input 14 and the planetary gear set 12. Moreover, where the output 16 is located between the input 14 and the planetary gear set 12, as shown in the drawings, for all forward drive ratios the entire power flow path of driving rotation through the transmission 10, in a direction parallel to the main axis 52 of the transmission 10, is at or between the input 14 and the planetary gear set 12. In the example depicted, the main axis 52 of the transmission 10 is the axis of rotation of the input 14, and the central axis of rotation of the planetary gear set 12.

Figure 4:
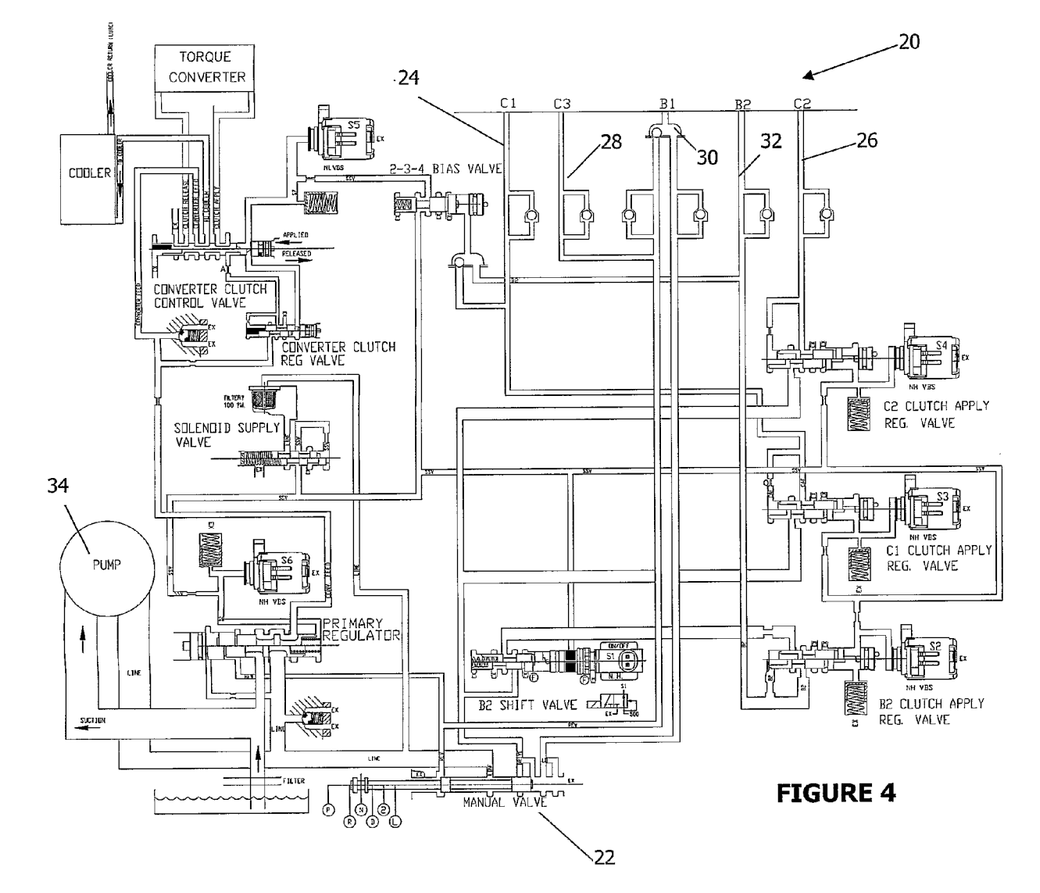
FIG. 4 is a diagrammatic representation of an electro-hydraulic control system of the transmission shown in FIG. 3.

The transmission 10 also includes a control system 20 for selectively engaging/disengaging the friction elements C1, C2, C3, B1 and B2 in different combinations to effect selection of the drive ratios of the transmission 10. With reference to FIG. 4, the control system 20 includes a manual valve 22 for selection of various transmission state positions ("Park", "Reverse", "Neutral", "Drive", "2" and "L") by a person driving the vehicle. The control system 20 includes hydraulic lines which feed each of the friction elements C1, C2, C3, B1, B2 with hydraulic fluid, represented with reference numerals 24, 26, 28, 30 and 32, respectively. A pump 34 supplies hydraulic fluid at pressure, and valves are used to control operation of the friction elements C1, C2, C3, B1 and B2 according to the table shown in FIG. 2. The hydraulic control system 20 has the following features:

Use of low flow/low pressure solenoids with high flow direct acting valves and no accumulators.

Solenoid dampers are located in valve plugs to save space and improve thermal expansion/leakage 4 forward gears with the use of only one shift valve 5 VBS's or low flow VFSNPS's and only one on/off solenoid A Bias valve that is energised by the application of forward clutches to enable lockup in all gears other than P, R, N, and D1.

A lockup control valve and regulator valve that are hydraulically linked so that both the switching function and pressure ramping function are controlled by one low pressure/low flow solenoid.

Solenoid supply pressure is independent of line pressure with additional filtration.

Advantageously, as the first and second clutches are mounted forward of the planetary gear set 12, and due to power flow in each of the forward drive ratios being transmitted from the input 14 to the planetary gear set 12 via only one or both of the first and second clutches C1, C2, a relatively short and rigid drive path is achieved in all forward gears. In this way, in each of the forward drive ratios rotational drive from the input to the planetary gear set is transmitted along a path entirely forward of a rearmost component of the planetary gear set. This is in contrast to prior art arrangements such as the transmission disclosed in U.S. Pat. No. 4,884,472 in which clutches transmitting power in forward drive ratios are located behind a planetary gear set such that the path along which power flows is longer, less compact and more prone to vibration.

Returning to FIG. 1, an output 36 of the first clutch C1 is in direct coupling with a carrier 38 of the planetary gear set 12 such that rotation of the output 36 causes rotation of the carrier 38. Similarly, an output 40 of the second clutch C2 is in direct coupling with a forward sun gear 42 of the planetary gear set 12 such that rotation of the output 40 of the second clutch C2 causes rotation of the forward sun gear 42. Accordingly, as both the first clutch C1 and second clutch C2 are connected to the input 14 of the transmission 10, by engagement of the first clutch C1 and/or the second clutch C2, power is transmitted from the input 14 of the transmission 10 to the planetary gear set 12.

The planetary gear set 12 also includes a rear sun gear 44, a short pinion 46, a long pinion 48, and a ring gear 50. The forward sun gear 42 is in direct rotational coupling with the short pinion 46, and the rear sun gear 44 is in direct rotational coupling with the long pinion 48. Each of the short pinion 46 and long pinion 48 is mounted to the carrier 38, and rotates relative to the carrier 38. The ring gear 50 is mounted in direct rotational coupling with the long pinion 48. The forward sun gear, 42, rear sun gear 44, ring gear 50, carrier 38, and first and second clutches C1, C2 rotate about a main axis 52 of the transmission 10.

The ring gear 50 is directly connected to the output 16 of the transmission 10, such that rotation of the ring gear 50 causes rotation of the output 16 of the transmission 10. More specifically, with reference to FIG. 3, the output 16 of the transmission 10 is in the form of an output gear 54 in fixed relationship with the ring gear 50, and is in direct rotational coupling with a first pinion shaft gear 56 such that a pinion shaft 58 mounted in parallel relationship with the main axis 52 of the transmission 10 rotates in response to rotation of the ring gear 50. The pinion shaft 58 has a second pinion shaft gear 60 which, in turn, rotates a differential 62 so as to power driving wheels of the vehicle.

Figure 3:
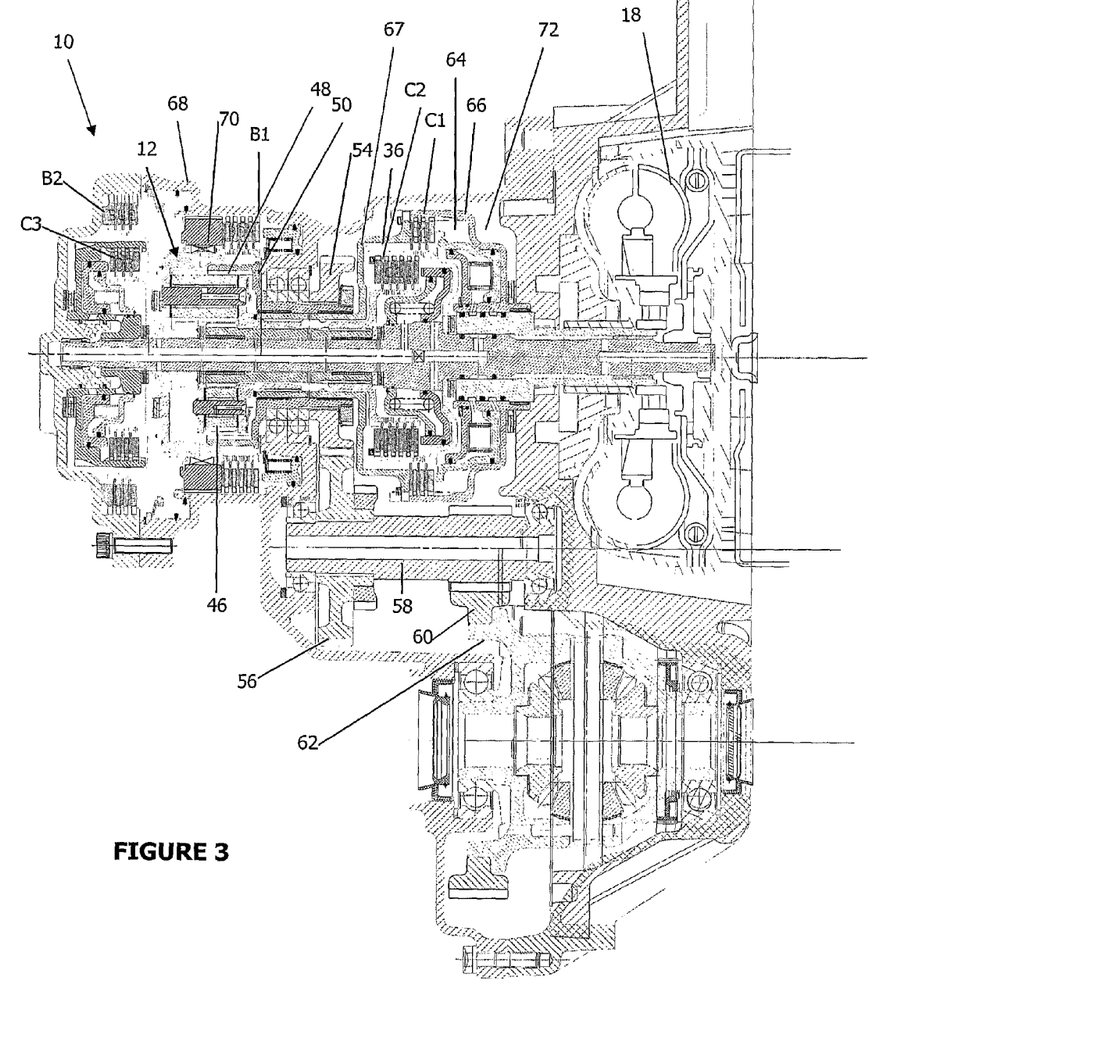
FIG. 3 is a diagrammatic sectional representation of a transmission in accordance with the present invention.

As can be seen with reference to FIG. 3, the second clutch C2 is nested within the first clutch C1 such that the second clutch C2 rotates within a cavity 64 formed by the input part 66 and the output part 67 of the first clutch C1. Accordingly, the first and second clutches C1, C2 are packaged efficiently within the transmission 10 so as to minimise axial length occupied by the first and second clutches C1, C2.

The third clutch C3 is mounted behind the planetary gear set 12, as shown in FIGS. 1 and 3. Power flow in a reverse drive ratio of the transmission 10 is transmitted from the input 14 of the transmission 10 to the planetary gear set 12 through the third clutch C3. By mounting the third clutch C3 behind the planetary gear set 12, the power flow distance in the forward gears is minimised, by mounting the planetary gear set 12 as far forward as possible. The third clutch C3 is not engaged in any of the forward drive ratios.

Also included in the transmission 10 are the first and second brake clutches B1, B2, the first brake clutch B1 being arranged to brake the carrier 38 of the planetary gear set 12 to a housing 68 of the transmission 10, and the second brake clutch B2 being arranged to brake the rear sun gear 44 of the planetary gear set 12 to the housing 68. Advantageously, the third clutch C3 is mounted radially inward of the second brake clutch B2, and in line with the second brake clutch B2, so as to minimise length of the transmission 10.

A one-way clutch 70 is mounted between the housing 68 and the carrier 38 to allow rotation of the carrier 38 only in one direction relative to the housing 68. Accordingly, rotation of the one-way clutch prevents the transmission 10 from providing braking from input 14 to output 16 in at least one forward driving state, and in other gear states the one-way clutch 70 is bypassed to permit braking from input 14 to output 16. With reference to the table of FIG. 2, it can be seen that the one-way clutch 70 is utilised in an alternative gear state of the first ratio, wherein the second clutch C2 is engaged and all other friction elements are disengaged. As such, operation in this state allows the vehicle to drive in the first ratio, without engine braking. By engagement of the first brake clutch B1, the carrier 38 is held stationary with respect to the housing 68, which prevents rotation of the one-way clutch, thus providing a different gear state of the first ratio, in which engine braking is provided. By hydraulic release of the first brake clutch B1, and engagement of the second brake clutch B2, still with the second clutch C2 engaged, a second ratio of the transmission is obtained. A third ratio of the transmission 10 is obtained by hydraulic release of the second brake clutch B2, and engagement of the first clutch C1. Hydraulic release of the second clutch C2, and engagement of the second brake clutch B2 provides a fourth ratio of the transmission 10.

Figure 2:
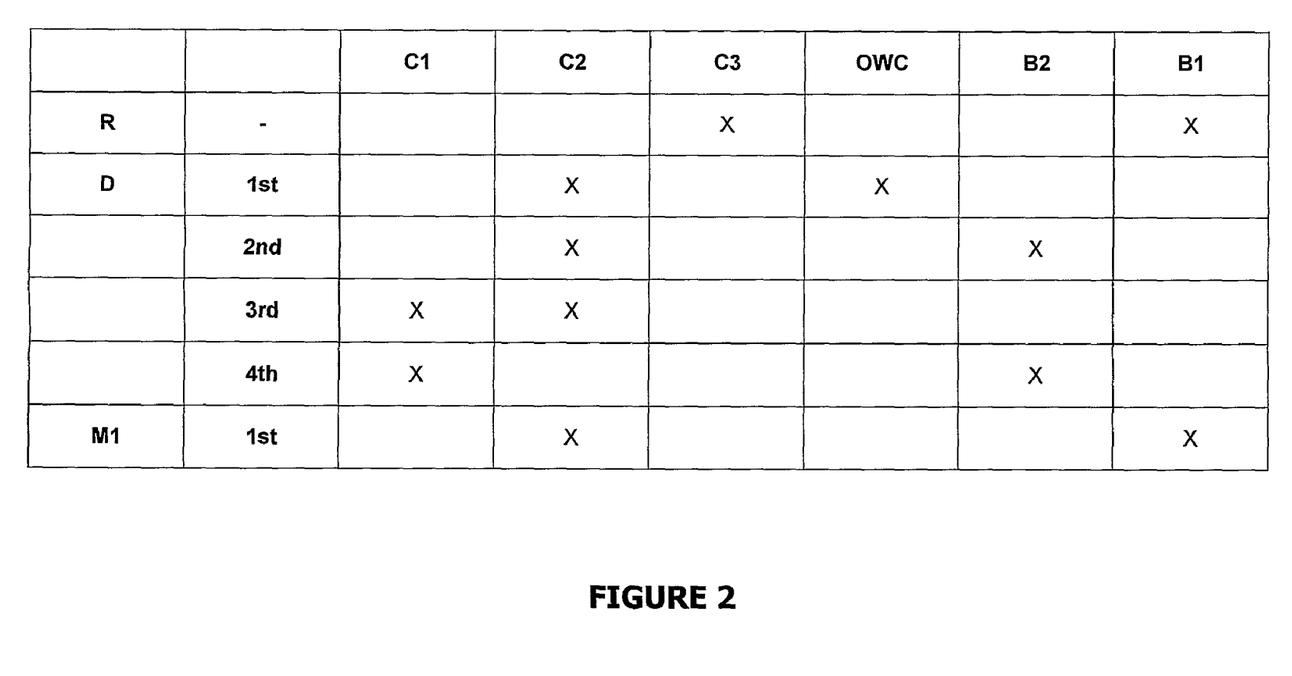
FIG. 2 is a table showing shift elements used in various gears offered by the transmission represented in FIG. 1.

Application of the different friction elements in the various gears offered by the transmission is shown in the table in FIG. 2, and power flow in each of the forward drive ratios is described below:

First Gear:
The one way clutch which is connected to the carrier holds/grounds the carrier in first gear. Drive is through the C2 clutch, then the forward sun gear (the carrier is held by the one way clutch) and through the ring gear to the output.

Second Gear:
During second gear, brake clutch B2 is applied, which holds/grounds the reverse sun gear. The input is through the C2 clutch, then the forward sun gear, which rotates the short pinions which rotate with the long pinions (which react against the reverse sun gear). The reverse sun gear is grounded by B2. The one way clutch overruns and the carrier rotates, the ring gear (and output) "walks" around the carrier.

Third Gear:
During third gear, brake clutch B2 is released and clutch C1 is applied. Clutch C1 holds the carrier. The input is through both the C1 clutch and the C2 clutch, so that the gear set rotates as one, so that the gear ratio is 1:1.

Fourth Gear:
During fourth gear, clutch C1 is applied and clutch B2 is applied. The clutch B2 grounds the reverse sun gear so that the long and short pinions react against the reverse sun gear. Input is through the clutch C1 which is connected to the carrier. The output is through the ring gear.

A reverse ratio of the transmission 10 is obtained by way of manual operation of the manual valve 22 by the driver of the vehicle, in response to which the third clutch C3 and the first brake clutch B1 are engaged. Similarly, a selected neutral condition is obtained by operation of the manual valve 22 to the "N" position, in response to which all of the friction elements C1, C2, C3, B1, B2 are disengaged.

The above transmission 10 has been described by way of example only and modifications are possible within the scope of the invention. In an alternative example, the torque converter 18 may be omitted, in which case input 14 of the transmission may be coupled to an engine of the vehicle by way of a two-speed decoupler, a simple damper, or one or more launch clutches. These components may be mounted in a space vacated by the torque converter 18 or may alternatively be mounted within a main housing 72 of the transmission 10. In one variation, the existing clutches C1, C2 and C3 are controlled so as to serve as the launch clutches. As will be appreciated by those skilled in the art, by omitting the torque converter it is possible to avoid the inefficiencies associated with torque converters. In another arrangement, the two-speed decoupler may be packaged on the pinion shaft 58. Advantageously, use of a two-speed decoupler enables the number of forward ratios to be increased to 5, 6, 7 or even 8 different ratios.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A multi-ratio automatic transmission for a vehicle, the transmission having a single planetary gear set, a plurality of friction elements for coupling components of the planetary gear set between an input and an output of the transmission in different configurations so as to achieve a plurality of forward drive ratios, and a control system for selectively engaging/disengaging the friction elements in different combinations to effect selection of the ratios, wherein the friction elements include first and second clutches mounted between the input and the planetary gear set, and wherein power flow in each of the forward drive ratios is transmitted from the input to the planetary gear set via at least one of the first and second clutches, wherein, when in a first gear state of a first ratio, the second clutch is engaged, a first brake clutch is engaged, and the other friction elements are disengaged, wherein when in an alternative gear state of the first ratio, a second clutch is engaged, and the other friction elements are disengaged.

2. A multi-ratio automatic transmission as claimed in claim 1, wherein an output of the first clutch is in direct coupling with a carrier of the planetary gear set such that rotation of the output of the first clutch causes rotation of the carrier.

3. A multi-ratio automatic transmission as claimed in claim 1, wherein an output of the second clutch is in direct coupling with a sun gear of the planetary gear set such that rotation of the output of the second clutch causes rotation of the sun gear.

4. A multi-ratio automatic transmission as claimed in claim 3, wherein the sun gear is a forward sun gear of the planetary gear set.

5. A multi-ratio automatic transmission as claimed in claim 1, wherein a ring gear of the planetary gear set is in direct coupling with the output of the transmission such that rotation of the ring gear causes rotation of the output of the transmission.

6. A multi-ratio automatic transmission as claimed in claim 5, wherein the output of the transmission is in the form of an output gear fixed to the ring gear, and the output gear is in direct rotation coupling with a pinion shaft, which in turn is in direct rotation coupling with a differential of the vehicle.

7. A multi-ratio automatic transmission as claimed in claim 1, wherein the second clutch is nested within the first clutch such that second clutch rotates within a cavity formed within the input and output parts of the first clutch.

8. A multi-ratio automatic transmission as claimed in claim 1, including a third clutch mounted behind the planetary gear set, wherein power flow in a reverse drive ratio of the transmission is transmitted from the input of the transmission to the planetary gear set through the third clutch.

9. A multi-ratio automatic transmission as claimed in claim 1, including the first clutch and a second brake clutch, wherein the first brake clutch is arranged to brake a carrier of the planetary gear set to a housing of the transmission, and the second brake clutch is arranged to brake a rear sun gear of the planetary gear set to the housing of the transmission.

10. A multi-ratio automatic transmission as claimed in claim 1, including a one-way clutch, wherein the one-way clutch is arranged to allow rotation of a carrier only in one direction relative to the housing of the transmission, such that rotation of the one-way clutch prevents the transmission from providing braking from input to output in at least one forward driving state, and in other gear states the one-way clutch is bypassed to permit braking from input to output.

11. A multi-ratio automatic transmission as claimed in claim 1, wherein for a second ratio of the transmission, the second clutch is engaged, a second brake clutch is engaged, and the other friction elements are disengaged.

12. A multi-ratio automatic transmission as claimed in claim 11, wherein for a third ratio of the transmission, the first and second clutches are engaged, and the other friction elements are disengaged.

13. A multi-ratio automatic transmission as claimed in claim 12, wherein for a fourth ratio of the transmission, the first clutch is engaged, the second brake clutch is engaged, and the other friction elements are disengaged.

14. A multi-ratio automatic transmission as claimed in claim 12, wherein for a reverse ratio of the transmission, the third clutch is engaged, the first brake clutch is engaged, and the other friction elements are disengaged.

15. A multi-ratio automatic transmission as claimed in claim 14, wherein for a selected neutral condition of the transmission, none of the friction elements are engaged.

16. A multi-ratio automatic transmission as claimed in claim 1, wherein the first clutch is the front-most component mounted in a main housing of the transmission.

17. A multi-ratio automatic transmission as claimed in claim 16, wherein the main housing of the transmission is located behind a torque converter which couples the input of the transmission to an engine of the vehicle.

* * * * *

UNITED STATES PATENT AND TRADEMARK OFFICE
CERTIFICATE OF CORRECTION

PATENT NO. : 8,388,489 B2  Page 1 of 1
APPLICATION NO. : 12/740416
DATED : March 5, 2013
INVENTOR(S) : Fitzgerald et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 264 days.

Signed and Sealed this
First Day of September, 2015

Michelle K. Lee
*Director of the United States Patent and Trademark Office*